United States Patent
Zou et al.

(10) Patent No.: US 11,044,055 B2
(45) Date of Patent: Jun. 22, 2021

(54) METHODS OF SHARING HARQ PROCESS IDS BETWEEN SEMI-PERSISTENT SCHEDULING AND DYNAMIC GRANTS

(71) Applicant: Telefonaktiebolaget LM Ericsson (publ), Stockholm (SE)

(72) Inventors: Zhenhua Zou, Solna (SE); Ali Behravan, Stockholm (SE); Stefan Parkvall, Bromma (SE)

(73) Assignee: Telefonaktieboiaget LM Ericsson (publ), Stockholm (SE)

( * ) Notice: Subject to any disclaimer, the term of this patent is extended or adjusted under 35 U.S.C. 154(b) by 40 days.

(21) Appl. No.: 16/613,023

(22) PCT Filed: May 9, 2018

(86) PCT No.: PCT/IB2018/053232
§ 371 (c)(1),
(2) Date: Nov. 12, 2019

(87) PCT Pub. No.: WO2018/211364
PCT Pub. Date: Nov. 22, 2018

(65) Prior Publication Data
US 2021/0083806 A1    Mar. 18, 2021

Related U.S. Application Data

(60) Provisional application No. 62/506,142, filed on May 15, 2017.

(51) Int. Cl.
*H04L 1/18* (2006.01)
*H04W 72/14* (2009.01)
*H04W 72/04* (2009.01)

(52) U.S. Cl.
CPC .......... *H04L 1/1819* (2013.01); *H04L 1/1896* (2013.01); *H04W 72/042* (2013.01); *H04W 72/0493* (2013.01); *H04W 72/14* (2013.01)

(58) Field of Classification Search
None
See application file for complete search history.

(56) References Cited

U.S. PATENT DOCUMENTS

| 8,359,509 B2 | 1/2013 | Womack et al. |
| 8,687,568 B2 | 4/2014 | Montojo et al. |

(Continued)

FOREIGN PATENT DOCUMENTS

| CN | 104012022 A | 8/2014 |
| DE | 10 2011 085 075 A1 | 4/2013 |
| WO | 2008 115134 A2 | 9/2008 |

OTHER PUBLICATIONS

PCT Notification of Transmittal of the International Search Report and the Written Opinion of the International Searching Authority, or the Declaration for International application No. PCT/IB2018/053232—dated Aug. 28, 2018.

*Primary Examiner* — Hong S Cho
(74) *Attorney, Agent, or Firm* — Baker Botts, LLP

(57) ABSTRACT

According to an aspect, a network node reduces a probability of collision between HARQ process IDs used for acknowledging transmissions between the network node and a UE. The network node determines HARQ process IDs associated with dynamic grants of uplink resources and HARQ process IDs associated with semi-persistent scheduling (SPS). The HARQ process IDs are determined so as to reduce the probability of collision of the HARQ process IDs. The network node indicates at least the HARQ process IDs associated with the dynamic grants to the UE. The UE communicates HARQ messages using the HARQ process IDs.

25 Claims, 12 Drawing Sheets

(56) References Cited

U.S. PATENT DOCUMENTS

2010/0325503 A1 12/2010 Womack et al.
2015/0085796 A1* 3/2015 Xu .................... H04W 72/0493
 370/329

* cited by examiner

METHODS OF SHARING HARQ PROCESS IDS BETWEEN SEMI-PERSISTENT SCHEDULING AND DYNAMIC GRANTS

PRIORITY

This nonprovisional application is a U.S. National Stage Filing under 35 U.S.C. § 371 of International Patent Application Serial No. PCT/IB 2018/053232 filed May 9, 2018 and entitled "Methods of Sharing HARQ Process IDs Between Semi-Persistent Scheduling and Dynamic Grants" which claims priority to U.S. Provisional Patent Application No. 62/506,142 filed May 15, 2017 both of which are hereby incorporated by reference in their entirety.

TECHNICAL FIELD

Certain embodiments of the present disclosure relate, in general, to wireless communications and more particularly to methods for reducing a probability of collision between Hybrid Automatic Repeat Request (HARQ) process IDs used for acknowledging transmissions between a network node and a user equipment (UE).

BACKGROUND

In cellular wireless systems, such as Long Term Evolution (LTE) and New Radio (NR) standards in 3GPP, resources for uplink (UL) transmissions are normally scheduled by the network node (eNB or gNB). This can be done dynamically, i.e., the eNB schedules the UL transmission per transmission time interval (TTI). Alternatively, this can be done using the semi-persistent scheduling (SPS) framework, so that multiple TTIs are granted at the same time, i.e., prior to a data transmission. Configuration of SPS includes a periodicity of the grant, an allocation and the modulation and coding scheme (MCS) in subsequent SPS occasions.

Another related concept in wireless transmission is data retransmission. When the transmission of data fails due to some errors in the channel that cannot be fixed in the decoding, the receiver may ask the transmitter for data retransmission. The retransmission method may simply be transmitting the same data or a better coded data with a lower rate. At the receiver side, the receiver may simply use the new, retransmitted data instead of the old data or combine them to make a more reliable detection. This is the basis of Hybrid Automatic Repeat Request (HARQ).

LTE uses a synchronous HARQ concept where acknowledgement of correctly received data or negative acknowledgement of an erroneous detection (ACK/NACK) has to be sent by the receiver of data at a certain time in a Physical Hybrid-ARQ Indicator Channel (PHICH). In LTE, the user equipment (UE) uses the same HARQ process number every 8 TTIs. Retransmission of the data, if needed, with the same HARQ happens every 8 TTIs. Since the UE uses a specific HARQ process identity (ID) at a specific subframe, the eNB knows exactly which HARQ process comes when.

The NR standard that is being specified in 3GPP is based on asynchronous HARQ transmission, which means that there is no certain time that is expected for ACK/NACK.

SUMMARY

Certain problems can be envisioned in NR. When a UE is configured with both semi-persistent scheduling (SPS is a type of configured grant) and dynamic grants of uplink resources, there are no rules for how to effectively handle HARQ process IDs. For example, the HARQ process ID for a dynamic grant is specified by the gNB in the uplink grant, while there is a formula for computing the SPS HARQ process IDs. There is no rule between the gNB and the UE for determining a HARQ process ID for SPS so as to avoid a collision between the HARQ process ID used for SPS and HARQ process IDs used for dynamic grants.

Embodiments of the present invention provide solutions to this problem. According to some embodiments, a method at a network node for reducing a probability of collision between HARQ process IDs used for acknowledging transmissions between the network node and a UE includes determining HARQ process IDs associated with dynamic grants of uplink resources and HARQ process IDs associated with SPS, where the HARQ process IDs are determined so as to reduce the probability of collision of the HARQ process IDs. The method then includes indicating at least the HARQ process IDs associated with the dynamic grants to the UE.

A more specific solution may include configuring separate pools of HARQ process IDs, such as a pool for HARQ process IDs to be used for dynamic grants and a separate pool for HARQ process IDs to be used for SPS. According to some embodiments, a method includes selecting the HARQ process IDs associated with the dynamic grants from a first pool of HARQ process IDs, where the first pool of HARQ process IDs is disjoint from a second pool of HARQ process IDs comprising the HARQ process IDs associated with SPS. The method may then include indicating a HARQ process ID associated with a first dynamic grant signaled in a downlink control information (DCI) using fewer bits than would be otherwise necessary to indicate one of the HARQ process IDs. For example, three DCI bits may be used (e.g., compact DCI) rather than four bits.

According to some embodiments, a method at a UE for reducing a probability of collision between HARQ process ID used for acknowledging transmissions between a network node and the UE includes receiving HARQ process IDs associated with dynamic grants of uplink resources. The method also includes communicating HARQ messages using the HARQ process IDs associated with the dynamic grants and HARQ process IDs associated with SPS, where the HARQ process IDs are determined so as to reduce the probability of collision of the HARQ process IDs.

According to some embodiments, a network node configured for reducing a probability of collision between HARQ process IDs used for acknowledging transmissions between the network node and a UE includes transceiver circuitry configured for communicating with the UE. The network node also includes processing circuitry operatively associated with the transceiver circuitry and configured to determine HARQ process IDs associated with dynamic grants of uplink resources and HARQ process IDs associated with SPS, where the HARQ process IDs are determined so as to reduce the probability of collision of the HARQ process IDs. The processing circuitry is also configured to indicate at least the HARQ process IDs associated with the dynamic grants to the UE.

According to some embodiments, a UE configured for reducing a probability of collision between HARQ process ID used for acknowledging transmissions between a network node and the UE includes transceiver circuitry configured for communicating with the network node. The UE also include processing circuitry operatively associated with the transceiver circuitry and configured to receive HARQ process IDs associated with dynamic grants of uplink resources. The processing circuitry is also configured to communicate HARQ messages using the HARQ process IDs associated with the dynamic grants and HARQ process IDs associated with SPS, where the HARQ process IDs are determined so as to reduce the probability of collision of the HARQ process IDs.

Certain embodiments of the present disclosure provide one or more technical advantages. One technical advantage includes avoiding HARQ process ID collisions when both dynamic grants and SPS are scheduled. Note that SPS may be considered a type of configured grant in NR terminology. Another advantage is that more HARQ processes can be addressed.

Further embodiments may include apparatuses, computer program products and non-transitory computer readable media that store instructions that, when executed by processing circuit, perform the operations of the embodiments describe above.

For example, in certain embodiments a computer program product comprises program instructions for a processor (124) in a network node (120) of a wireless network, wherein said program instructions are configured so as to cause the network node (120) to carry out a method (700) as described herein when the program instructions are executed by the processor (124).

In certain embodiments, a computer program product comprises program instructions for a processor (114) in a User Equipment, UE, (110) operating in a wireless network, wherein said program instructions are configured so as to cause the UE (110) to carry out a method (800) as described herein when the program instructions are executed by the processor (114).

In certain embodiments a non-transitory computer-readable medium (126) comprises stored thereupon, the computer program product of the above embodiments.

Certain embodiments comprise a network node (120) adapted to perform a method (700) as described herein. Certain embodiments comprise a UE (110) adapted to perform a method (800) as described herein.

In certain embodiments a network node (120) is configured for reducing a probability of collision between Hybrid Automatic Repeat Request, HARQ, process identities, IDs, used for acknowledging transmissions between the network node (120) and a user equipment, UE, (110), wherein the network node (120) comprises a determining module (602) for determining HARQ process IDs associated with dynamic grants of uplink resources and HARQ process IDs associated with semi-persistent scheduling, SPS, wherein the HARQ process IDs are determined so as to reduce the probability of collision of the HARQ process IDs, and a communication module (604) for indicating at least the HARQ process IDs associated with the dynamic grants to the UE (110).

In certain a user equipment, UE, (110) is configured for reducing a probability of collision between Hybrid Automatic Repeat Request, HARQ, process identities, IDs, used for acknowledging transmissions between a network node (120) and the UE (110), wherein the UE (110) comprises a receiving module (406) for receiving HARQ process IDs associated with dynamic grants of uplink resources, and a communication module (404) for communicating HARQ messages using the HARQ process IDs associated with the dynamic grants and HARQ process IDs associated with semi-persistent scheduling, SPS, wherein the HARQ process IDs are determined so as to reduce the probability of collision of the HARQ process IDs.

DETAILED DESCRIPTION

Figure 1:
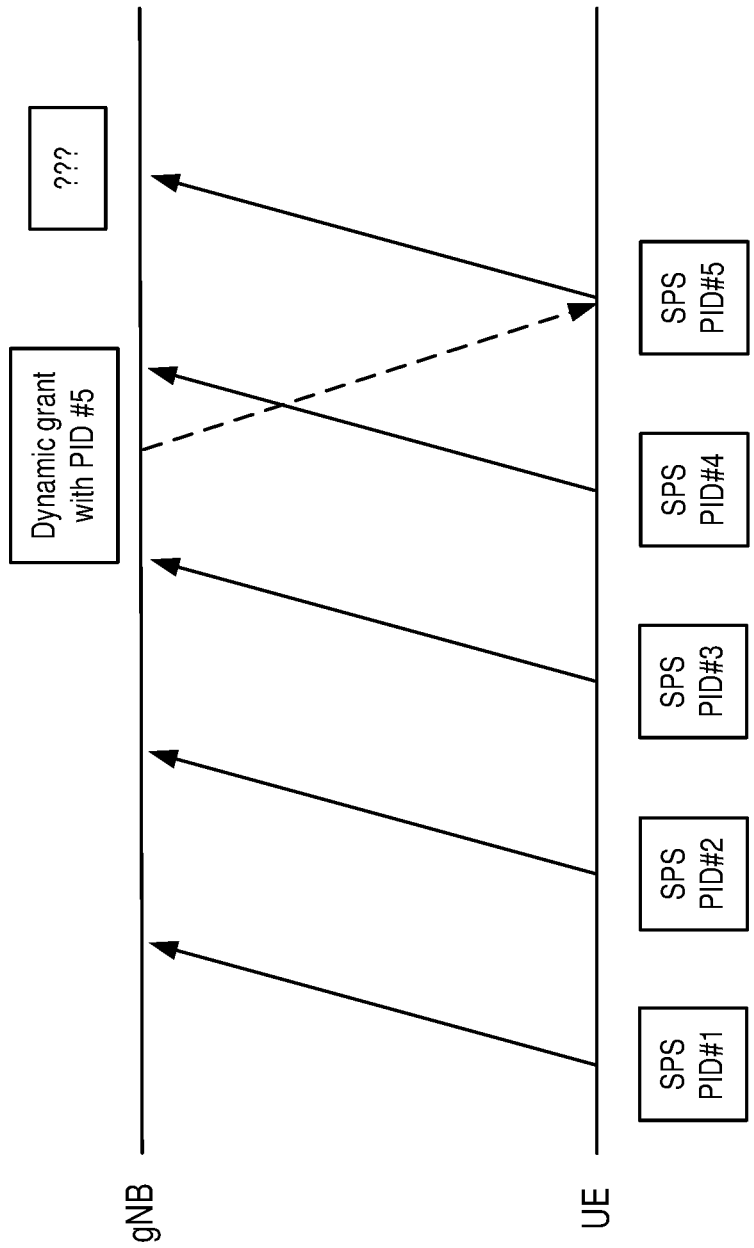
FIG. 1 is a diagram illustrating a HARQ process ID collision.

Embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that some of these embodiments are not mutually exclusive. Components from one embodiment can be tacitly assumed to be present/used in another embodiment. While the embodiments are discussed in the context of NR, it will be appreciated that the techniques may be applied to successors of NR as well as other applicable wireless networks.

Collisions can occur between HARQ process IDs used for dynamic grants of uplink resources and HARQ process IDs used for semi-persistent scheduling (SPS). In the example shown by FIG. 1, a UE with a SPS grant is about to send process ID (PID) #4 and receives a dynamic grant with PID #5. Due to some processing time, the UE may still transmit the SPS grant with PID #5 while the gNB assumes that the UE has sent the dynamic grant with PID #5. Embodiments described herein help to avoid such HARQ process ID collisions. Embodiments also include methods to share HARQ process IDs for dynamic grants and SPS with a reduced number of downlink control information (DCI) bits.

Specifying HARQ Process IDs for Dynamic Grants and SPS from Separate Pools

According to certain embodiments, the set of all HARQ process IDs is divided into two disjoint sets for the dynamic grants and for the SPS. In other words, the total number of the HARQ process IDs (i.e., N) is equal to the sum of the number of HARQ process IDs for dynamic grants and SPS, respectively:

$$N_{dynamic} + N_{SPS} = N.$$

The allocation of the two sets can be static or dynamic, and the allocation can be configurable by the network node (e.g., gNB). The two HARQ pools do not have to be of the same size.

Suppose N=16. As an example, the gNB can configure HARQ process IDs $\{0, 1, 2, \ldots, 7\}$ for dynamic grant uplink transmission, and HARQ process IDs $\{8, 9, \ldots, 15\}$ for SPS transmission. That is, if N, or 16, is a sum of the number of the HARQ process IDs for dynamic grants and the number of the HARQ process ID for SPS, a HARQ process ID for a dynamic grant (or SPS) signaled in a DCI may be indicated using fewer bits than the number of bits needed to identify any one of 16 HARQ process IDs.

A benefit of this approach is that the control signaling for a HARQ process ID can be kept low and the DCI only needs to select the HARQ process among the processes used for dynamic scheduling. For example, 0-7 (requiring an indication with three bits) can be used in the example above instead of 0-15 (requiring an indication with four bits), thereby saving one bit in the DCI.

To dynamically schedule a retransmission of SPS data, the same DCI of (e.g., three) bits, as in the example above, can be used to signal HARQ process IDs {8, 9, . . . , 15}. In this case, some other information bits in DCI can be used to indicate to the UE that the HARQ process number relates to the SPS pool and not the dynamic grant pool. As one example, certain embodiments can re-use the bits that are related with the signaling of the Transport Block size (TBS), as the TBS in the retransmission is always the same as the initial transmission.

Figure 2:
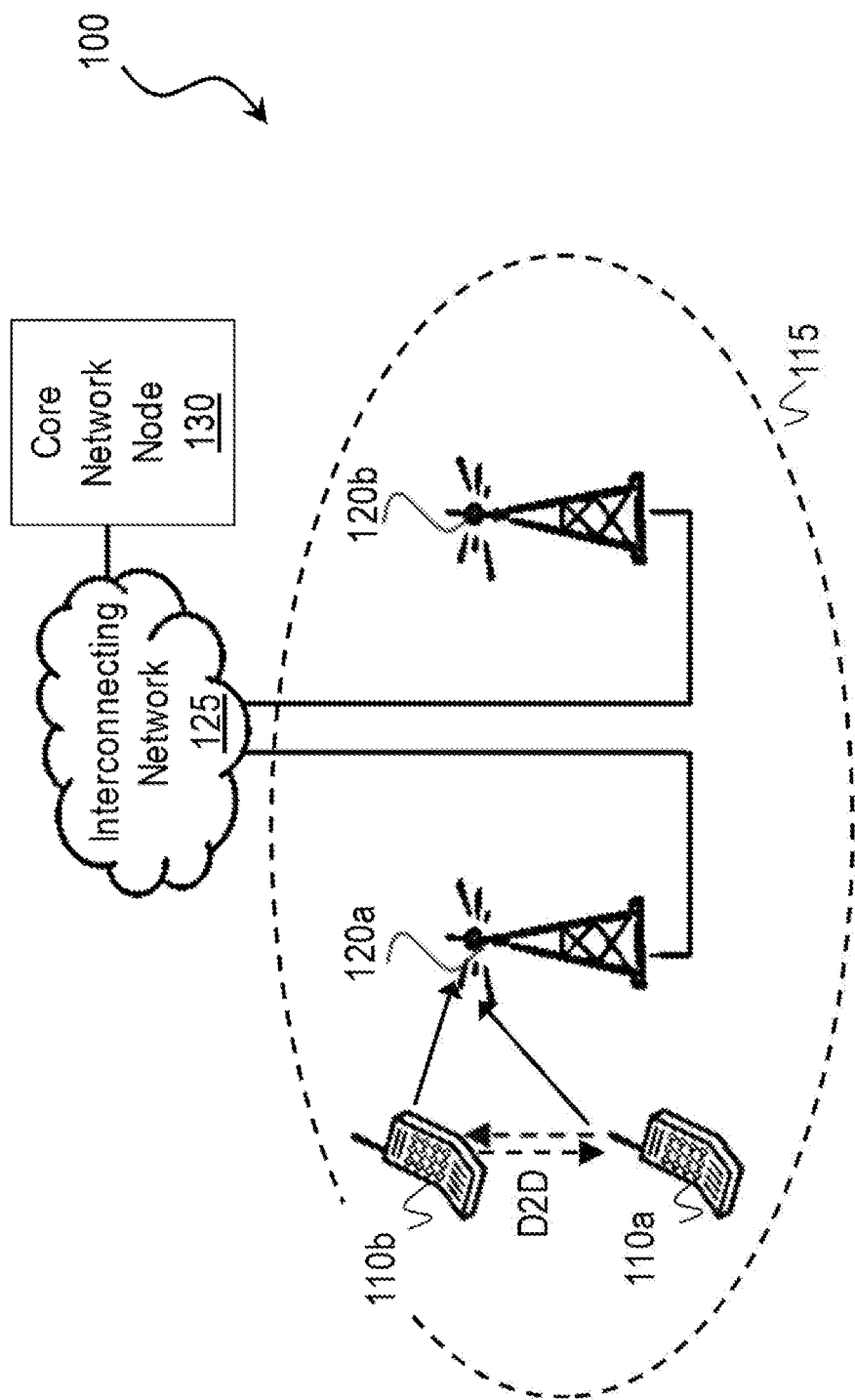
FIG. 2 is a diagram illustrating a wireless network.

Accordingly, FIG. 2 illustrates an example of a wireless network 100 that may utilize HARQ for wireless communications. Wireless network 100 includes a plurality of radio nodes. Examples of radio nodes include wireless devices 110a-110b (such as a UE) and radio access network nodes 120a-120b (such as a gNB, eNB, or base station). Radio access network nodes 120 connect to one or more core network nodes 130 via an interconnecting network 125. Wireless devices 110 within coverage area 115 may each be capable of communicating directly with radio access network nodes 120 over a wireless interface. Wireless devices 110 may also be capable of communicating with each other via device-to-device (D2D) communication.

As an example, wireless device 110a may communicate with radio access network node 120a over a wireless interface. That is, wireless device 110a may transmit wireless signals and/or receive wireless signals from radio access network node 120a. The wireless signals may contain voice traffic, data traffic, control signals, and/or any other suitable information. In some embodiments, an area of wireless signal coverage associated with a radio access network node 120 may be referred to as a cell.

In some embodiments wireless device 110 may be interchangeably referred to by the non-limiting term user equipment (UE). Wireless device 110 refers to any type of wireless device communicating with a network node and/or with another UE in a cellular or mobile communication system. Examples of UE are target device, device to device (D2D) UE, V2x UE, machine type UE or UE capable of machine to machine (M2M) communication, PDA, PAD, Tablet, mobile terminals, smart phone, laptop embedded equipped (LEE), laptop mounted equipment (LME), USB dongles, etc. Thus, although FIG. 2 illustrates wireless devices 110 as phones, other embodiments may use other types of wireless devices 110. Example embodiments of wireless device 110 are described in more detail below with respect to FIGS. 3-4.

In some embodiments, radio access network node 120 may be interchangeably referred to by the non-limiting terms gNB, eNB, base station, network node, or wide area network (WAN) node. The WAN node can be a UE (e.g. D2D UE) or a network node (e.g., access point, base station, cellular node, etc.). Example embodiments of radio access network node 120 are described in more detail below with respect to FIGS. 5-6.

In certain embodiments, radio access network nodes 120 may interface with a radio network controller. The radio network controller may control radio access network nodes 120 and may provide certain radio resource management functions, mobility management functions, and/or other suitable functions. In certain embodiments, the functions of the radio network controller may be included in radio access network node 120. The radio network controller may interface with core network node 130. In certain embodiments, the radio network controller may interface with core network node 130 via an interconnecting network 125.

Interconnecting network 125 may refer to any interconnecting system capable of transmitting audio, video, signals, data, messages, or any combination of the preceding. Interconnecting network 125 may include all or a portion of a public switched telephone network (PSTN), a public or private data network, a local area network (LAN), a metropolitan area network (MAN), a WAN, a local, regional, or global communication or computer network such as the Internet, a wireline or wireless network, an enterprise intranet, or any other suitable communication link, including combinations thereof.

Although FIG. 2 illustrates a particular arrangement of network 100, the present disclosure contemplates that the various embodiments described herein may be applied to a variety of networks having any suitable configuration. For example, network 100 may include any suitable number of wireless devices 110 and radio access network nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While the embodiments are described for NR, the embodiments may be utilized in any applicable RAT, including LTE or wireless local area network (WLAN).

Figure 3:
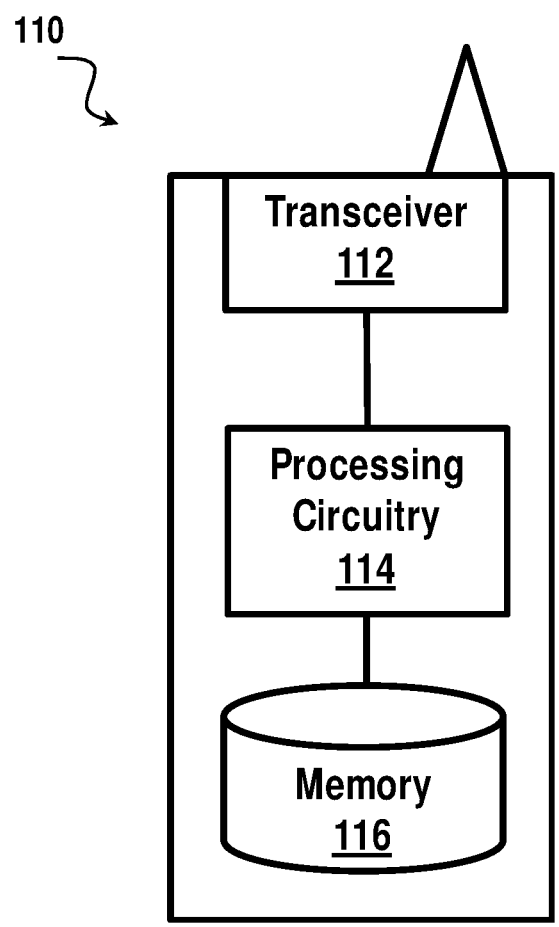
FIG. 3 is a block diagram of a wireless device configured to carry out one or more of the techniques described herein, according to some embodiments.

FIG. 3 is a block diagram of an exemplary wireless device 110, in accordance with certain embodiments. Wireless device 110 includes a transceiver 112, processing circuitry 114 (e.g., comprising one or more processors), and memory 116. In some embodiments, transceiver 112 facilitates transmitting wireless signals to and receiving wireless signals from network node/WAN node/radio access node 120 (e.g., via an antenna), processing circuitry 114 executes instructions to provide some or all of the functionality described herein as being provided by a wireless device (or UE), and memory 116 stores the instructions executed by processing circuitry 114.

Processing circuitry 114 may include any suitable combination of hardware and software implemented in one or more modules to execute instructions and manipulate data to perform some or all of the described functions of wireless device 110, such as the function of communicating a HARQ ACK/NACK message to a network node according to a HARQ process ID. In some embodiments, processing circuitry 114 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor may comprise one or more of the modules discussed with respect to FIG. 4.

Memory 116 is generally operable to store instructions, such as a computer program, software, an application including one or more of logic, rules, algorithms, code, tables, etc. and/or other instructions capable of being executed by a processor. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 114 of wireless device 110.

Other embodiments of wireless device 110 may include additional components beyond those shown in FIG. 3 that may be responsible for providing certain aspects of the wireless device's functionality, including any of the functionality described herein and/or any additional functionality (including any functionality necessary to support the solution described herein). As just one example, wireless device 110 may include input devices and circuits, output devices, and one or more synchronization units or circuits, which may be part of the processing circuitry. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

According to some embodiments, processing circuitry 114 is configured to operate wireless device 110 (e.g., UE) to reduce a probability of collision between HARQ process IDs used for acknowledging transmissions between the network node 120 and the wireless device 110. Processing circuitry 114 is configured to receive HARQ process IDs associated with dynamic grants of uplink resources and communicate HARQ messages using the HARQ process IDs associated with the dynamic grants and HARQ process IDs associated with SPS, where the HARQ process IDs are determined so as to reduce the probability of collision of the HARQ process IDs.

Figure 4:
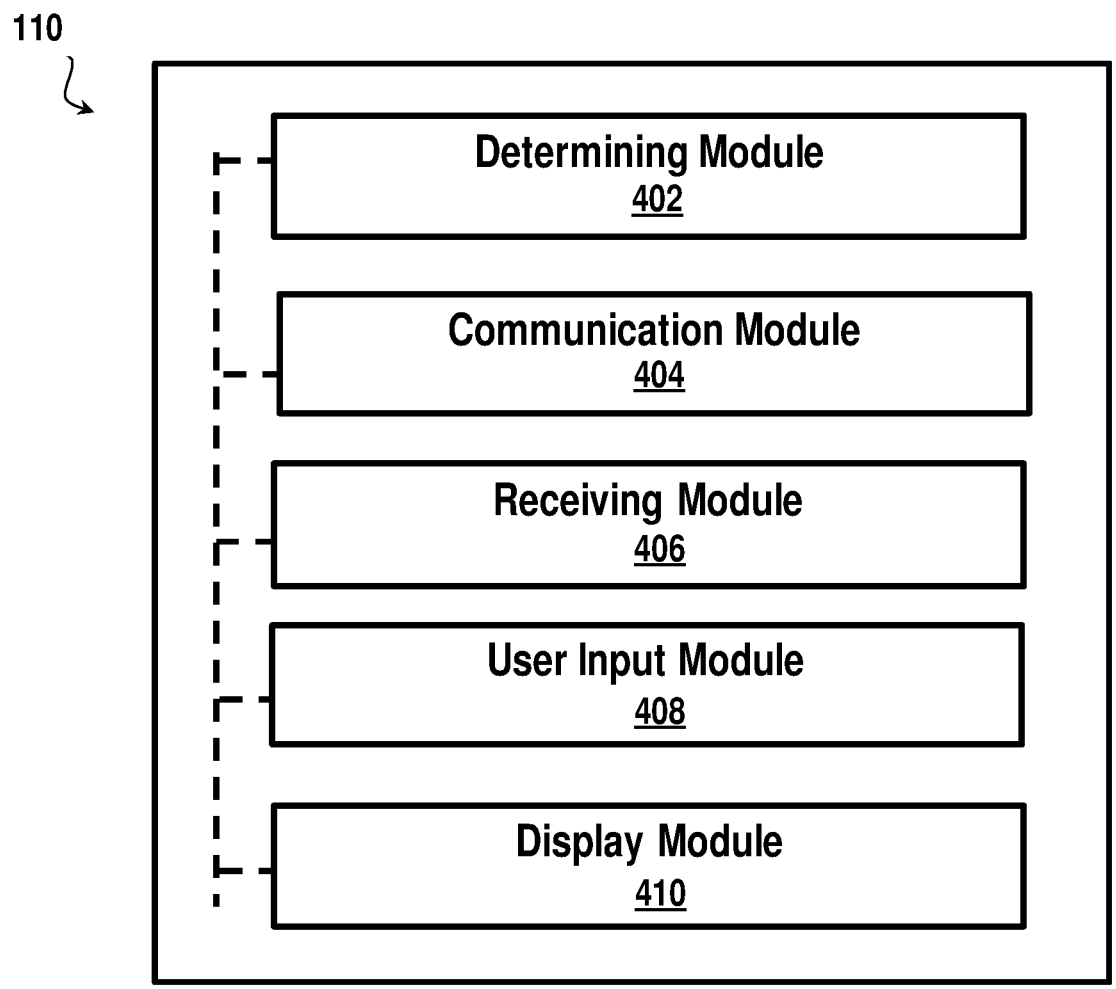
FIG. 4 is a block diagram of a functional implementation of a wireless device, according to some embodiments.

FIG. 4 illustrates examples of modules that can be included in wireless device 110. In certain embodiments, wireless device 110 may include any one or more of determining module(s) 402, communication module(s) 404, receiving module(s) 406, user input module(s) 408, display module(s) 410, and/or other suitable modules. The functionality of the modules may be integrated in a single component or separated among several components in any suitable manner. In certain embodiments, one or more of the modules may be implemented using processing circuitry 114 described with respect to FIG. 3.

Determining module 402 may perform the processing functions of wireless device 110 (including any of the UE functionality to support the above-described embodiments). As one example, determining module 402 may determine HARQ process IDs for SPS and dynamic grants. Determining module 402 may determine the HARQ process IDs in any suitable manner, such as based on a pre-configured rule or based on information received from a network node (such as a HARQ process ID assignment received from network node 120 and/or a rule received from network node 120). In certain embodiments, determining module 402 may determine the HARQ process IDs based on the techniques described herein.

Determining module 402 may include or be included in one or more processors, such as processing circuitry 114 described above in relation to FIG. 3. Determining module 402 may include analog and/or digital circuitry configured to perform any of the functions of determining module 402 and/or processing circuitry 114 described above. The functions of any of the modules described herein may, in certain embodiments, be performed in one or more distinct modules. Information may also pass between the modules and other components.

Communication module 404 may perform the transmission functions of wireless device 110. For example, in certain embodiments communication module 404 may communicate HARQ ACK/NACK messages. Communication module 404 may include a transmitter and/or a transceiver, such as transceiver 112 described above in relation to FIG. 3. Communication module 404 may include circuitry configured to wirelessly transmit messages and/or signals.

Receiving module 406 may perform the receiving functions of wireless device 110. For example, receiving module 406 may receive information from network node 120. The information could include a HARQ process ID assignment or a rule for determining the HARQ process ID in order to reduce the probability of a collision between dynamic grant and SPS HARQ process IDs. Receiving module 406 may include a receiver and/or a transceiver, such as transceiver 112 described above in relation to FIG. 3. Receiving module 406 may include circuitry configured to wirelessly receive messages and/or signals.

In some embodiments, receiving module 406 and communication module 404 may be part of a functional implementation, where receiving module 406 is for receiving HARQ process IDs associated with dynamic grants of uplink resources and communication module 404 is for communicating HARQ messages using the HARQ process IDs associated with the dynamic grants and HARQ process IDs associated with SPS, where the HARQ process IDs are determined so as to reduce the probability of collision of the HARQ process IDs.

In certain embodiments, wireless device 110 may optionally include a user input module 408 that may receive user input intended for wireless device 110. For example, user input module 408 may receive key presses, button presses, touches, swipes, audio signals, video signals, and/or any other appropriate signals. User input module 408 may include one or more keys, buttons, levers, switches, touchscreens, microphones, and/or cameras.

In certain embodiments, wireless device 110 may optionally include a display module 410, which may present signals on a display of wireless device 110. Display module 410 may include the display and/or any appropriate circuitry and hardware configured to present signals on the display.

Each module depicted in FIG. 4 may include any suitable configuration of hardware and/or software. Wireless device 110 may include additional modules beyond those shown in FIG. 4 that may be responsible for providing any suitable functionality, including any of the functionality described above and/or any additional functionality (including any functionality necessary to support the various solutions described herein).

In certain embodiments, some or all of the modules shown in FIG. 4 can be combined with one or more modules shown in FIG. 3. As an example, certain embodiments may combine at least some of the functionality of the processing circuitry 114 (FIG. 3) with the determining module 402 (FIG. 4). As another example, certain embodiments may combine at least some of the functionality of the transceiver 112 (FIG. 3) with the communication 404 and/or receiving modules 406 (FIG. 4).

Figure 5:
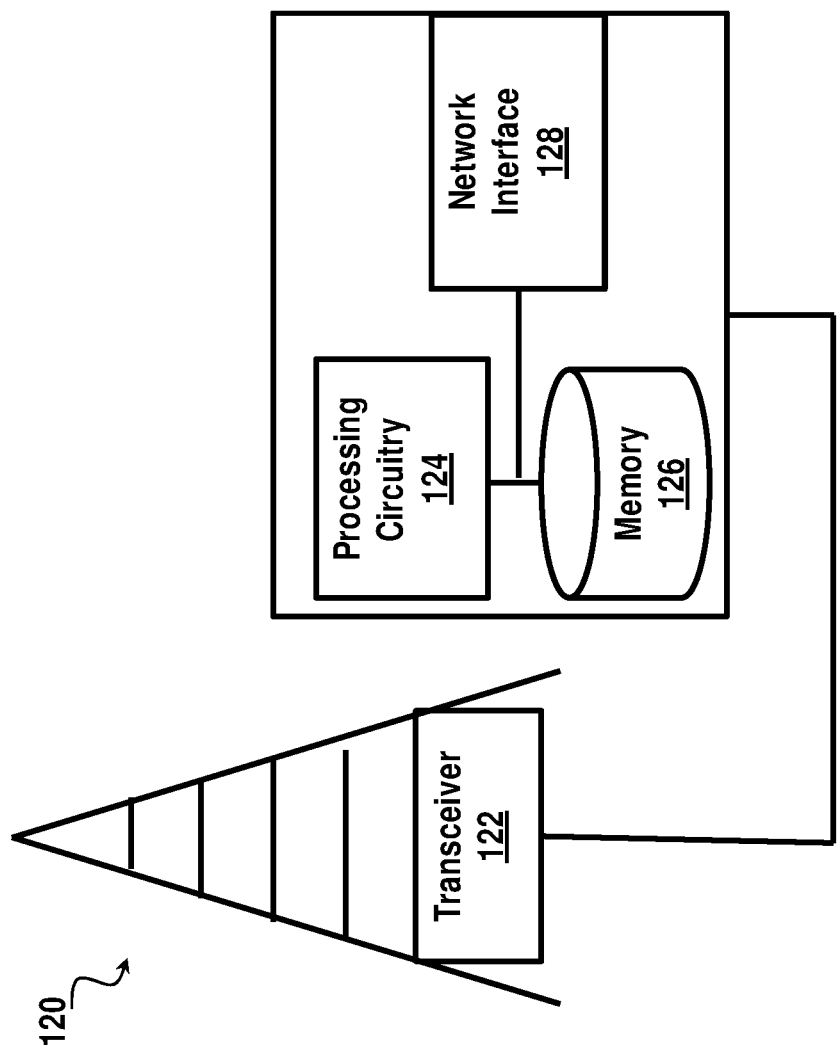
FIG. 5 is a block diagram of a network node configured to carry out one or more of the techniques described herein, according to some embodiments.

FIG. 5 is a block diagram of an exemplary radio access node, such as network node 120, in accordance with certain embodiments. Network node 120 may include one or more of a transceiver 122, processing circuitry 124 (e.g., comprising one or more processors), memory 126, and network interface 128. In some embodiments, transceiver 122 facilitates transmitting wireless signals to and receiving wireless signals from wireless device 110 (e.g., via an antenna), processing circuitry 124 executes instructions to provide some or all of the functionality described herein as being provided by network node 120, memory 126 stores the instructions executed by processing circuitry 124 and network interface 128 communicates signals to backend network components, such as a gateway, switch, router, Internet, Public Switched Telephone Network (PSTN), core network nodes or radio network controllers, etc.

Processing circuitry 124 may include any suitable combination of hardware and software implemented in one or more modules to execute instructions and manipulate data to perform some or all of the described functions of network node 120, such as the functions of specifying HARQ PID for dynamic grants and SPS in order to reduce the risk of HARQ process ID collision. In some embodiments, processing circuitry 124 may include, for example, one or more computers, one or more central processing units (CPUs), one or more microprocessors, one or more applications, and/or other logic. In certain embodiments, processing circuitry 124 may comprise one or more of the modules discussed with respect to FIG. 6.

Memory 126 is generally operable to store instructions, such as a computer program, software, an application including one or more of logic, rules, algorithms, code, tables, etc. and/or other instructions capable of being executed by a processor. Examples of memory 126 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 128 is communicatively coupled to processing circuitry 124, and network interface 128 may refer to any suitable device operable to receive input for network node 120, send output from network node 120, perform suitable processing of the input or output or both, communicate to other devices, or any combination of the preceding. Network interface 128 may include appropriate hardware (e.g., port, modem, network interface card, etc.) and software, including protocol conversion and data processing capabilities, to communicate through a network.

Other embodiments of network node 120 may include additional components beyond those shown in FIG. 5 that may be responsible for providing certain aspects of the network node 120's functionality, including any of the functionality described herein and/or any additional functionality. Core network node 130 may have comprise similar components as those shown in FIG. 5, however, a wireless interface (e.g., transceiver 122) is optional for core network node 130. The various different types of network nodes may include components having the same physical hardware but configured (e.g., via programming) to support different radio access technologies, or may represent partly or entirely different physical components.

According to some embodiments, processing circuitry 124 is configured to operate network node 120 to reduce a probability of collision between HARQ process IDs used for acknowledging transmissions between network node 120 and wireless device 110. Processing circuitry 124 is configured to determine HARQ process IDs associated with dynamic grants of uplink resources and HARQ process IDs associated with SPS, where the HARQ process IDs are determined so as to reduce the probability of collision of the HARQ process IDs. Processing circuitry 124 is also configured to indicate at least the HARQ process IDs associated with the dynamic grants to wireless device 110.

Figure 6:
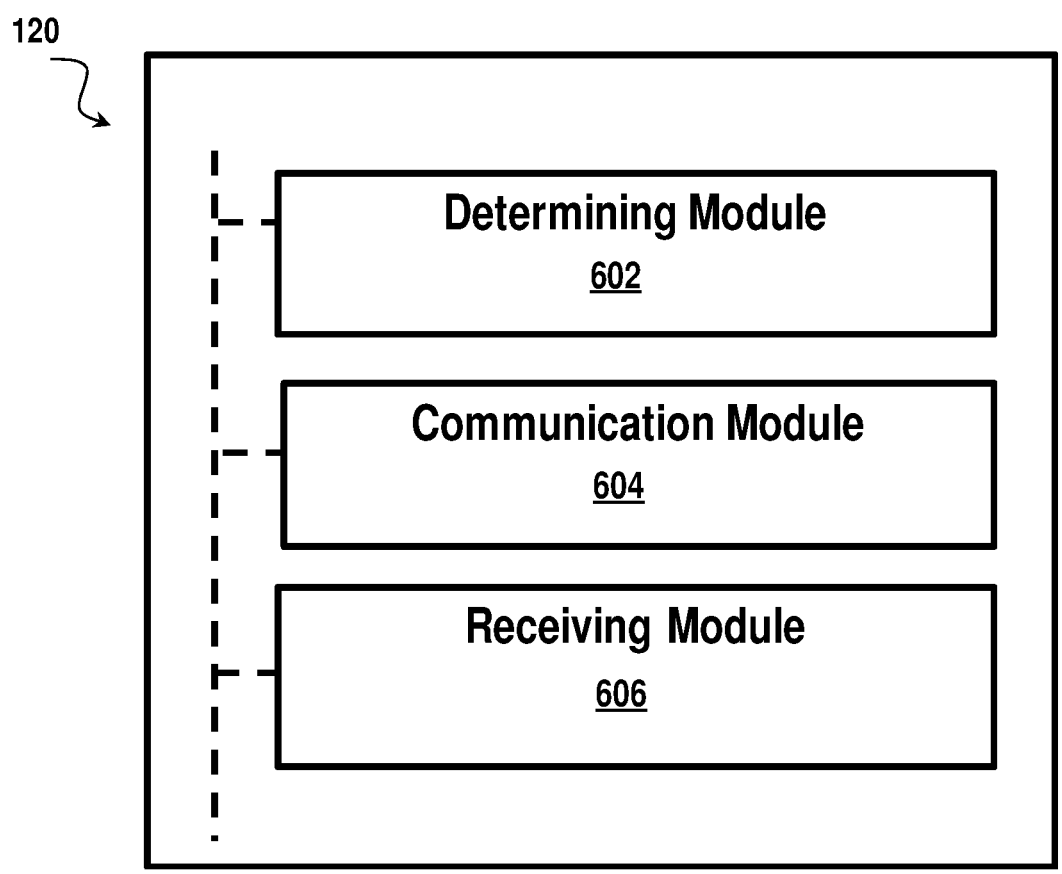
FIG. 6 is a block diagram of a functional implementation of a network node, according to some embodiments.

FIG. 6 illustrates examples of modules that can be included in network node 120. In certain embodiments, network node 120 may include any one or more of determining module(s) 602, communication module(s) 604, receiving module(s) 606, and/or other suitable modules. The functionality of the modules may be integrated in a single component or separated among several components in any suitable manner. In certain embodiments, one or more of the modules may be implemented using processing circuitry 124 described with respect to FIG. 5.

Determining module 602 may perform the processing functions of network node 120 (including any of the radio access network node functionality to support the above-described embodiments). As one example, the determining module 602 may specify HARQ process IDs for dynamic grants and SPS in order to reduce the risk of collision, for example, according to one or more of the methods described herein.

Determining module 602 may include analog and/or digital circuitry configured to perform any of the functions of the determining module 602 and/or processing circuitry 124 described above. The functions of modules of network node 120 can performed in one or more distinct modules, and the modules and components can pass information between them.

Communication module 604 may perform the transmission functions of network node 120. As one example, communication module 604 may transmit to wireless device 110 a selection of HARQ process IDs for dynamic grants and SPS and/or a rule that enables wireless device 110 to determine the HARQ process IDs. Communication module 604 may include a transmitter and/or a transceiver, such as transceiver 122 described above in relation to FIG. 5. As another example, communication module 604 may send information to other network nodes. Communication module 604 may include a network interface, such as interface 128 described above in relation to FIG. 5. Communication module 604 may include circuitry configured to transmit wireless and/or wired messages and/or signals.

Receiving module 606 may perform the receiving functions of network node 120. For example, receiving module 606 may receive HARQ ACK/NACK messages from wireless device 110. Receiving module 606 may include a receiver and/or a transceiver, such as transceiver 122 described above in relation to FIG. 5. As another example, receiving module 606 may receive information from other network nodes. Receiving module 606 may include a network interface, such as interface 128 described in relation to FIG. 5.

In certain embodiments, some or all of the modules shown in FIG. 6 can be combined with one or more modules shown in FIG. 5. As an example, certain embodiments may combine at least some of the functionality of processing circuitry 124 (FIG. 5) with determining module 602 (FIG. 6).

Figure 7:
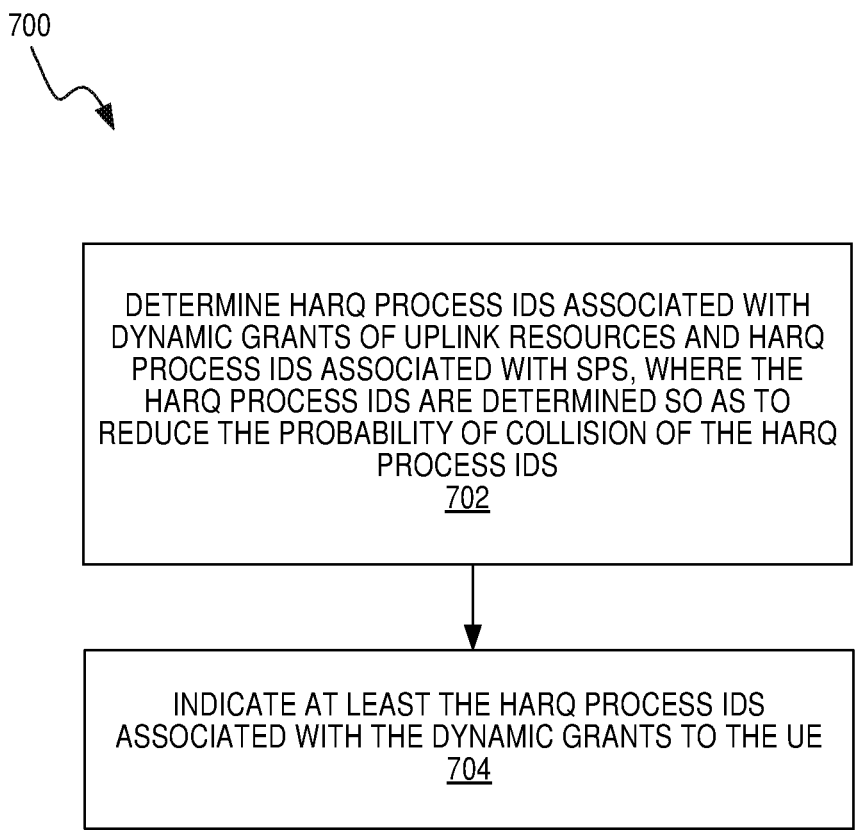
FIG. 7 is a flowchart illustrating a method in the network node, according to some embodiments.

According to some embodiments, processing circuitry 124 of network node 120 is configured to perform a method 700, shown in FIG. 7, for reducing a probability of collision between HARQ process IDs used for acknowledging transmissions between network node 120 and wireless device 110. Method 700 includes determining HARQ process IDs associated with dynamic grants of uplink resources and HARQ process IDs associated with SPS, where the HARQ process IDs are determined so as to reduce the probability of collision of the HARQ process IDs (block 702) and indicating at least the HARQ process IDs associated with the dynamic grants to the wireless device 110 (block 704). Method 700 may further include performing a transmission function using one or more of the HARQ process IDs.

Determining the HARQ process IDs may include selecting the HARQ process IDs associated with the dynamic grants from a first pool of HARQ process IDs, where the first pool of HARQ process IDs is disjoint from a second pool of HARQ process IDs comprising the HARQ process IDs associated with SPS.

In some embodiments, N is a sum of the number of the HARQ process IDs associated with the dynamic grants and the number of the HARQ process IDs associated with SPS, where a HARQ process ID associated with a first dynamic grant is indicated to wireless device 110 using fewer bits than a number of bits needed to identify any one of N HARQ process IDs. For example, a HARQ process ID associated with a first dynamic grant signaled in a DCI may be indicated to wireless device 110 using only three DCI bits (as opposed to four bits). The three DCI bits, or less, may be used as a compact DCI. Method 700 may further include indicating, to wireless device 110, that the HARQ process ID that is indicated pertains to a HARQ process ID associated with the first dynamic grant. The indication that the HARQ process ID pertains to a HARQ process ID associated with the first dynamic grant may be located in other bits, such as one or more DCI bits related to a TBS.

In some cases, wireless device 110 may know, or may have selected, the HARQ process IDs associated with SPS. In other cases, wireless device 110 does not know HARQ process IDs associated with SPS. Therefore, in further embodiments, method 700 at network node 120 may include selecting the HARQ process IDs associated with SPS from the second pool of HARQ process IDs. As mentioned above, the second pool of HARQ process IDs is disjoint or separate from the first pool of the HARQ process IDs associated with the dynamic grants.

The selected HARQ process IDs associated with SPS may be indicated to wireless device 110. In some embodiments, N is a sum of the number of the HARQ process IDs associated with the dynamic grants and the number of the HARQ process IDs associated with SPS, where a HARQ process ID associated with a first SPS is indicated to wireless device 110 using fewer bits than a number of bits needed to identify any one of N HARQ process IDs. For example, a HARQ process ID associated with the a first SPS signaled in a DCI is indicated to wireless device 110 using only three DCI bits.

Method 700 may include indicating, to wireless device 110, that the HARQ process ID that is indicated pertains to a HARQ process ID associated with the first SPS. The indication that the HARQ process ID pertains to a HARQ process ID associated with the first SPS may be located in other bits (e.g., DCI bits related to a TBS).

In some embodiments, an addressed HARQ process ID may be linked to a radio network temporary identifier (RNTI). In other embodiments, whenever wireless device 110 receives an uplink grant scrambled with a cell RTNI (C-RNTI) and a HARQ process ID field with x, this means that this is addressed for the dynamic grant with HARQ process ID x+8. As a follow up example, if the DCI bit for a HARQ process is even further reduced to two bits, then the sum of the number of HARQ processes for SPS (a type of configured grant) and dynamic grant can be smaller than N. Configured scheduling RNTI (CS-RNTI) may be used for configured grant type scheduling.

Figure 8:
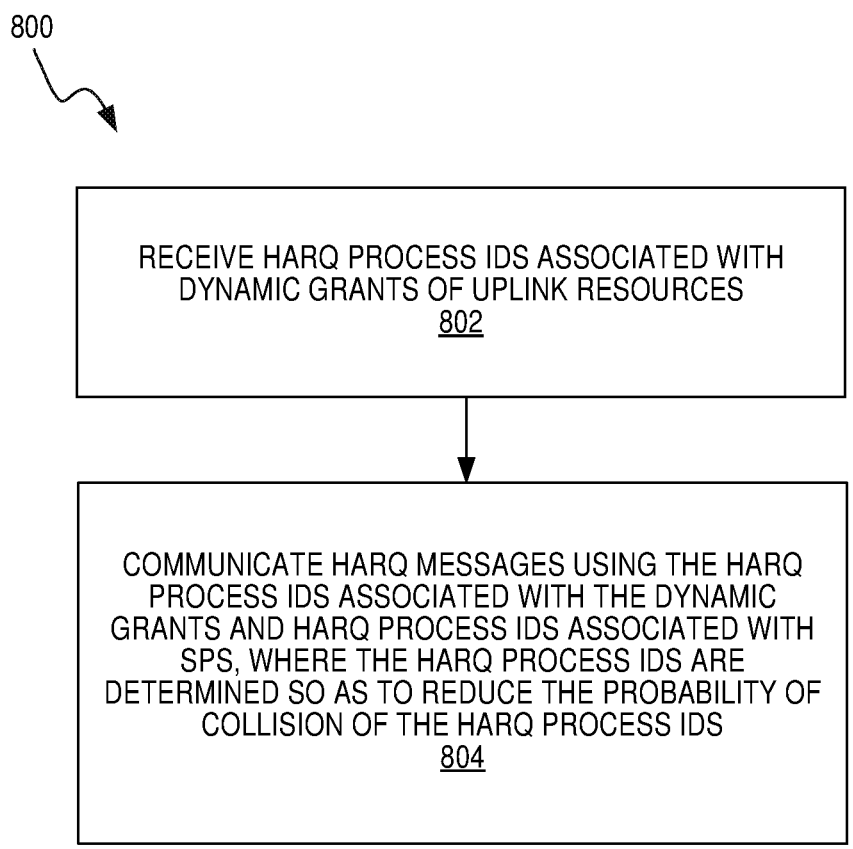
FIG. 8 is a flowchart illustrating a method in the wireless device, according to some embodiments.

Turning to wireless device 110, processing circuitry 114 of wireless device 110 is configured to perform, according to some embodiments, a method 800 shown in FIG. 8 for reducing a probability of collision between HARQ process IDs. Method 800 includes receiving HARQ process IDs associated with dynamic grants of uplink resources (block 802) and communicating HARQ messages using the HARQ process IDs associated with the dynamic grants and HARQ process IDs associated with SPS (block 804). The HARQ process IDs are determined so as to reduce the probability of collision of the HARQ process IDs.

The HARQ process IDs associated with the dynamic grants may be selected from a first pool of HARQ process IDs and the HARQ process IDs associated with SPS are selected from a second pool of HARQ process IDs. As mentioned above, the first pool and second pool of HARQ process IDs are disjoint or separate.

According to some embodiments, if N is a sum of the number of the HARQ process IDs associated with the dynamic grants and the number of the HARQ process IDs associated with SPS, a HARQ process ID associated with a first dynamic grant is indicated using fewer bits than a number of bits needed to identify any one of N HARQ process IDs. For example, a HARQ process ID associated with a first dynamic grant may be indicated using only three DCI bits (e.g., compact DCI).

Method 800 may include receiving an indication that the HARQ process ID that is indicated pertains to a HARQ process ID associated with the first dynamic grant. The indication that the HARQ process ID pertains to a HARQ process ID associated with the first dynamic grant may be located in other bits or signaling, such as in DCI bits related to a TBS.

In some embodiments, wireless device 110 knows the HARQ process IDs associated with SPS. In other embodiments, the method 800 includes receiving the selected HARQ process IDs associated with SPS from network node 120. In these embodiments, method 800 may include N being a sum of the number of the HARQ process IDs associated with the dynamic grants and the number of the HARQ process IDs associated with SPS, where a HARQ process ID associated with a first SPS is indicated using fewer bits than a number of bits needed to identify any one of N HARQ process IDs. A HARQ process ID associated with a first SPS may be received in only three DCI bits.

In further embodiments, method 800 includes receiving an indication that the HARQ process ID that is indicated pertains to a HARQ process ID associated with the first SPS. The indication that the HARQ process ID pertains to HARQ process ID associated with the first SPS may be located in DCI bits related to a TBS.

Figure 9:
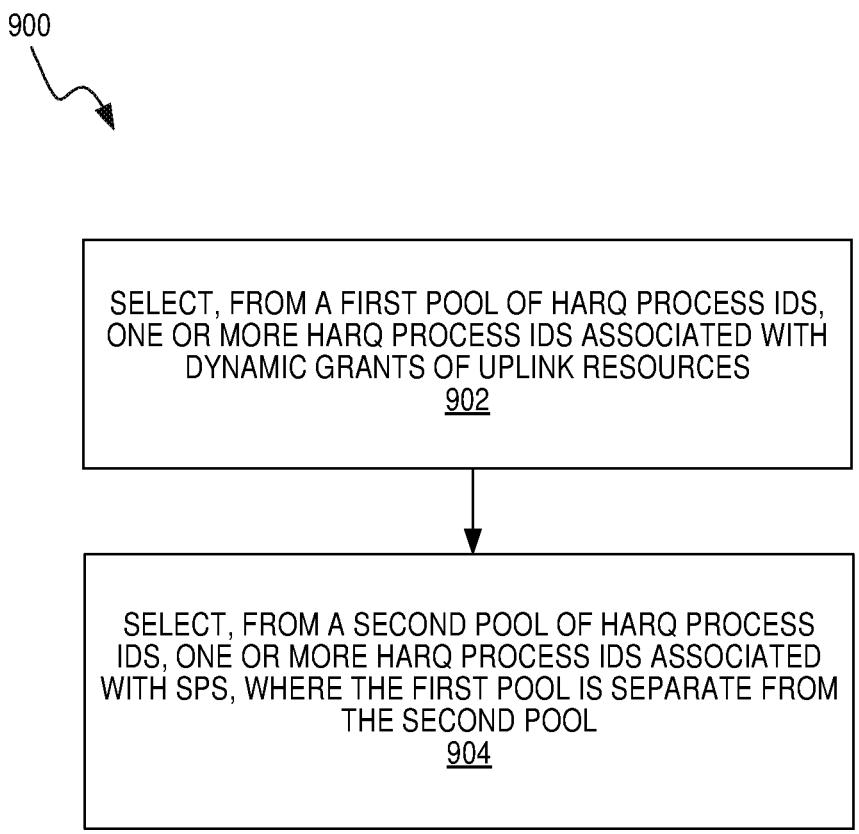
FIGS. 9-12 are flowcharts illustrating additional methods in the network node, according to some embodiments.

Network node 120 may utilize additional techniques to avoid dynamic grant and SPS HARQ process ID collisions. According to some embodiments, processing circuitry 124 of network node 120 is configured to perform another method 900, as shown in FIG. 9. Method 900 includes selecting, from a first pool of HARQ process IDs, one or more HARQ process IDs associates with dynamic grants of uplink resources (block 902). Method 900 also includes selecting, from a second pool of HARQ process IDs, one or more HARQ process IDs associated with SPS of uplink resources, where the first pool is separate from the second pool (block 904).

According to some embodiments, this method may more generally include selecting HARQ process IDs associated with dynamic grants of uplink resources and selecting HARQ process IDs associated with SPS. The selecting is performed according to a technique for minimizing a probability of a collision between the HARQ process IDs associated with the dynamic grants and the HARQ process IDs associated with SPS.

Specifying HARQ Process IDs for Dynamic Grants and SPS from One Pool

While certain embodiments involve configuring separate pools of HARQ process IDs, such as a pool for HARQ process IDs to be used for dynamic grants and a separate pool for HARQ process IDs to be used in SPS, other embodiments may include configuring a common pool for HARQ process IDs, where rules are defined to minimize the probability of collision when both dynamic grant and SPS are scheduled. For example, the rules can define a starting number for each process ID (PID) set or a buffer zone between the two PID sets.

Figure 10:
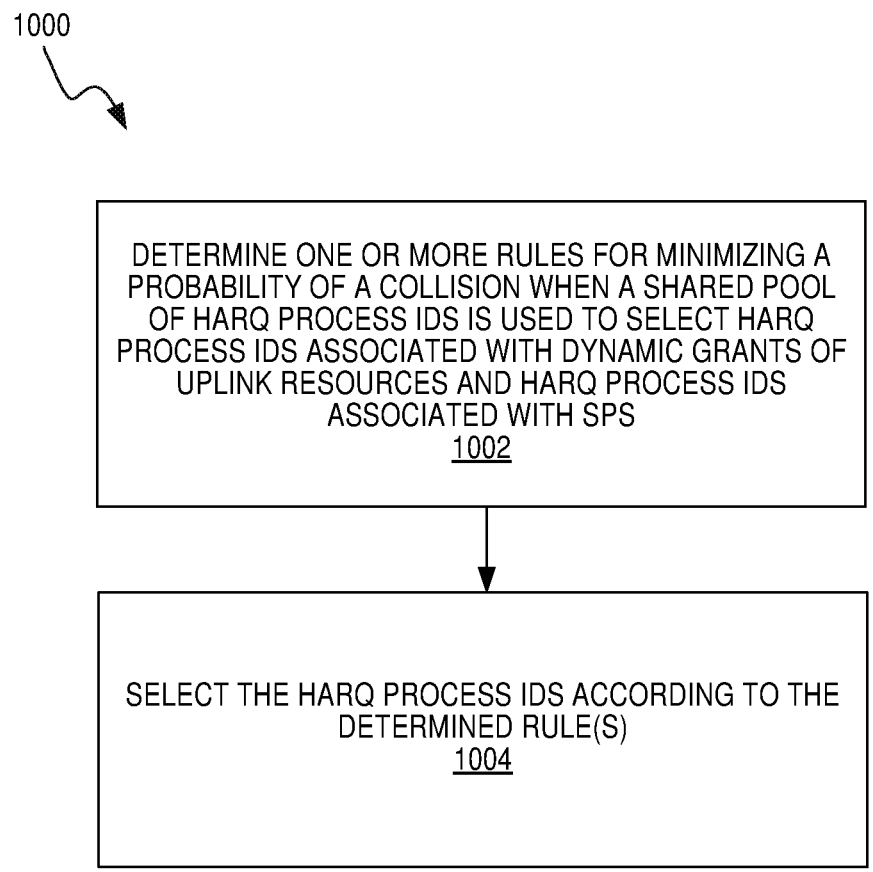

According to some embodiments, processing circuitry 124 of network node 120 is configured to perform a method 1000 shown in FIG. 10 that includes determining one or more rules for minimizing a probability of a collision when a shared pool of HARQ process IDs is used to select HARQ process IDs associated with dynamic grants of uplink resources and HARQ process IDs associated with SPS of uplink resources (block 1002). Method 1000 also includes selecting the HARQ process IDs according to the determined rules (block 1004).

Similar to the techniques described above, a reduced number of bits can be used for the embodiments involving the same pool of HARQ process IDs. For example, a reduced number of DCI bits for HARQ process IDs can address any given subset of the HARQ process IDs. According to one embodiment, the DCI bits are always used for addressing the HARQ process IDs 0, 1, 2, 3, ... $2^{x-1}$ where x is the number of the bits for HARQ processes.

Specifying the Order of HARQ Process IDs for Dynamic Grants and SPS

According to one embodiment, the HARQ process IDs for the dynamic grants and SPS start from the two ends of the range of HARQ process numbers, i.e., one method of scheduling uses HARQ process numbers in the order $\{0, 1, 2, 3, \ldots, N-1\}$, while the other scheduling method uses HARQ process numbers in the order $\{N-1, N-2, \ldots, 0\}$. In both scheduling methods, the HARQ PID for new data is the first un-used number from the starting point. For example, if HARQ PIDs $\{0, 2, 3\}$ are in-use, the HARQ PID for the next data is 1, instead of 4.

As a follow up of the above embodiment, a number n between and inclusive 0 and N–1 is picked. One method of scheduling uses HARQ process numbers in the order $$\{n, n+1, n+2, \ldots, n+N-1\}_{mod\ N},$$

while the other scheduling method uses HARQ process numbers in the order $$\{n-1, n-2, n-3, \ldots, n-N\}_{mod\ N}.$$

According to another embodiment, the order of HARQ PIDs can be sequential (either increment or decrement), but the starting HARQ process ID of one of the scheduling method depends on the current HARQ process number that is used by the other one such that they have the maximum distance in modulo N, where N is the total number of the HARQ processes, i.e., $$PID_{dynamic}=(PID_{SPS}+N/2)_{mod\ N}$$

$$PID_{SPS}=(PID_{dynamic}+N/2)_{mod\ N}$$

As an example, assume a SPS with PID #4 is being transmitted in the uplink and the total number of HARQ processes is 16. Then, if a dynamic grant needs to be sent to the UE, $PID_{dynamic}$ can be chosen to be at 4+8 to have the maximum distance to 4 in modulo 16.

Figure 11:
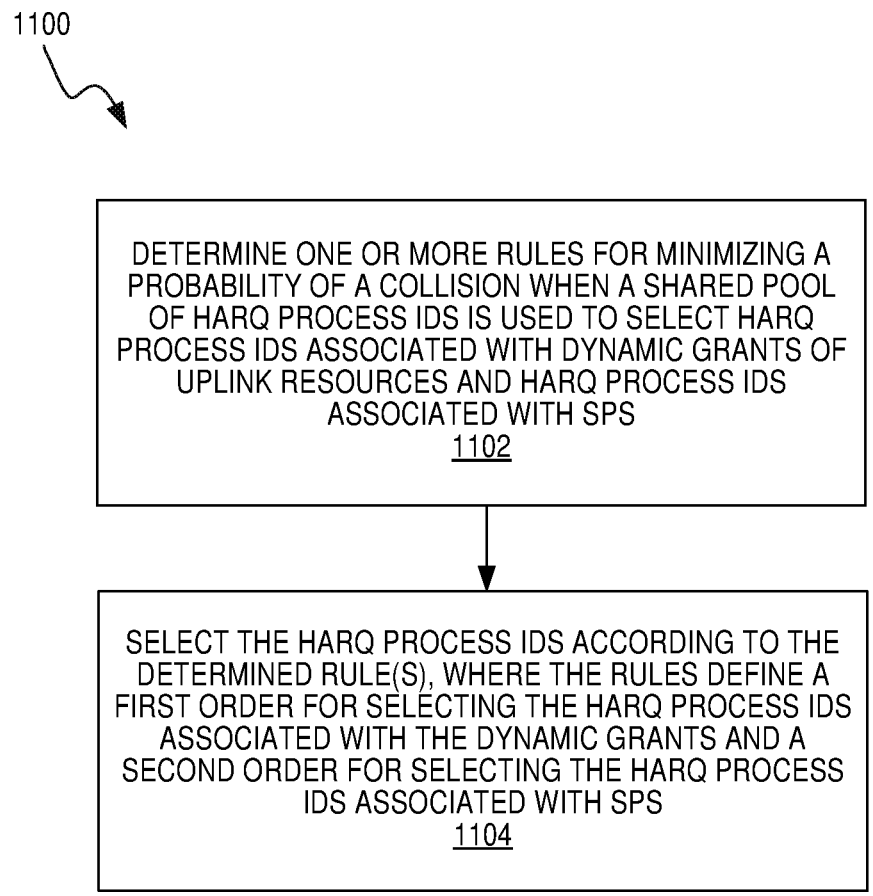

According to some embodiments, processing circuitry 124 of network node 120 is configured to perform a method 1100 shown in FIG. 11 that includes determining one or more rules for minimizing a probability of a collision when a shared pool of HARQ process IDs is used to select HARQ process IDs associated with dynamic grants of uplink resources and HARQ process IDs associated with SPS (block 1102). Method 1100 also includes selecting the HARQ process IDs according to the determined rule(s), where the rules define a first order for selecting the HARQ process IDs associated with the dynamic grants and a second order for selecting the HARQ process IDs associated with the SPS (block 1104).

Configuring an Offset Between the HARQ Process IDs for Dynamic Grants and SPS

According certain embodiments, to avoid collision between the HARQ PIDs used for dynamic grants and SPS, an offset between the two HARQ process IDs is configured:

$$PID_{dynamic}=(PID_{SPS}+k)_{mod\ N}$$

In other words, the process IDs for new data in both methods will not be within the offset.

In one exemplary embodiment, the absolute value of k can be chosen such that it is larger than the processing time in wireless device 110. In the example of FIG. 1, if the gNB needs to schedule a dynamic grant to the UE while the latest SPS TTI from the UE used SPS PID #3, assuming a processing time of 3 TTIs, the gNB can assign PID #6 (but cannot assign PID #4 or #5) to the dynamic grant in order to avoid collision between the two grants or ambiguity at the gNB.

In another exemplary embodiment, the absolute value of k can be chosen such that an unused PID pool is considered. In the example of FIG. 1, the gNB needs to schedule a dynamic grant to the UE while the latest SPS TTI from the UE used SPS PID #3 (assuming a processing time of 3 TTIs). If SPS PID #0 has been ACKed, the gNB can instead assign PID #5 to the dynamic grant since any two new data retransmissions for SPS will use PID #0, PID #4.

In some embodiments, the technique for minimizing the probability of the collision between the HARQ process IDs includes selecting the HARQ process IDs associated with the dynamic grants and the HARQ process IDs associated with SPS from a shared pool of HARQ process IDs according to rules defined to minimize the probability of the collision. The rules may define a first order for selecting the HARQ process IDs associated with the dynamic grants and a second order for selecting the HARQ process IDs associated with SPS.

The shared pool may include a number (N) of HARQ process IDs. One of the first order and the second order may select the first unused HARQ ID determined beginning with a first starting value x and moving upward (e.g., {x, x+1, x+2, ..., x+(N−1)}mod N). The other of the first order and the second order selects the first unused HARQ ID determined beginning with a second starting number y and moving downward (e.g., {y−1, y−2, y−3, ..., y−N}mod N). The first starting number x and the second starting number y may each be selected from the shared pool of HARQ process IDs. In this example, x=0 and y=N such that one of the first order and the second order selects the first unused HARQ ID determined beginning with 0 and moving upward (e.g., 0, 1, 2, ... N−1, 0, 1, ... and so on) and the other of the first order and the second order selects the first unused HARQ ID determined beginning with N−1 and moving downward (e.g., N−1, N−2, ... 2, 1, 0, N−1, N−2, ... and so on).

The rules may define an offset between the HARQ process IDs associated with the dynamic grants and the HARQ process IDs associated with SPS. In some embodiments, the absolute value of the offset is determined based on a processing time for wireless device 110 to process the dynamic grant of uplink resources or a processing time for wireless device 110 to process the SPS of uplink resources. In other embodiments, the absolute value of the offset is determined based on a maximum distance in modulo N between the HARQ process IDs associated with the dynamic grant and the HARQ process IDs associated with the SPS, where N indicates the total number of HARQ process IDs in the shared pool. The absolute value of the offset may be determined based on a HARQ process ID allocation rule and the unused number of HARQ process IDs.

As an example, suppose network node 120 needs to schedule a dynamic grant to wireless device 110 and, for purposes of example, assume that the latest SPS TTI from wireless device 110 used SPS PID #3 (processing time of 3 TTIs). If SPS PID #0 has been ACKed, network node 120 can instead assign PID #5 to the dynamic grant since any two new data retransmissions for SPS will use PID #0, PID #4.

Figure 12:
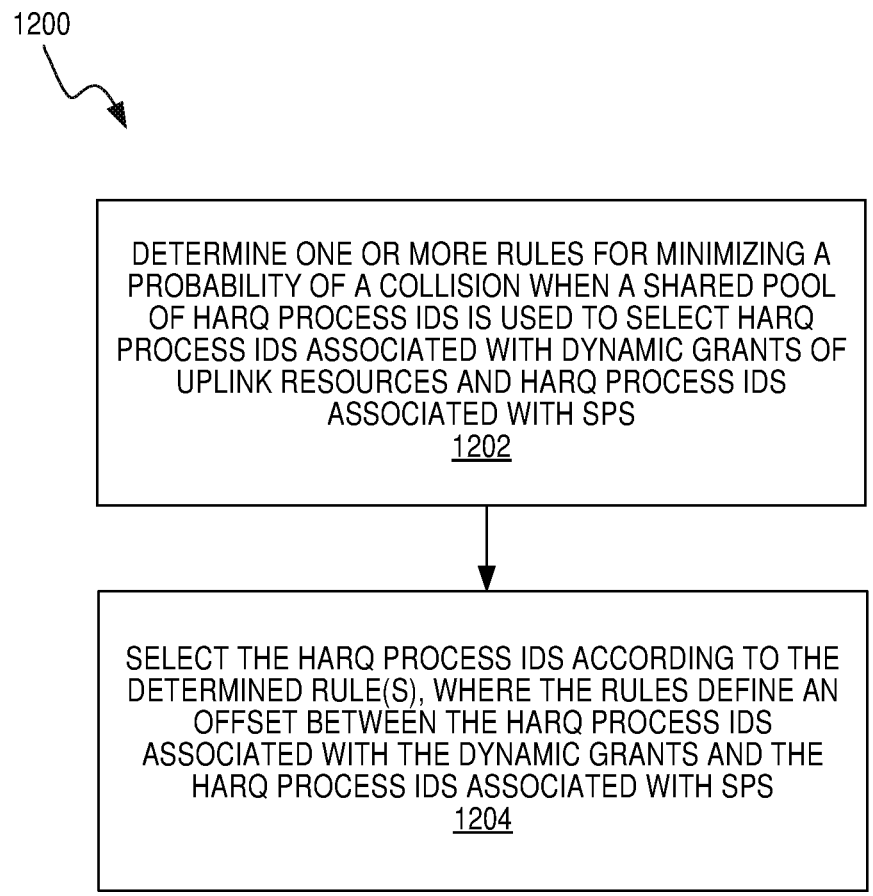

According to some embodiments, processing circuitry 124 of network node 120 is configured to perform a method 1200, as shown in FIG. 12. Method 1200 includes determining one or more rules for minimizing a probability of a collision when a shared pool of HARQ process IDs is used to select HARQ process IDs associated with dynamic grants of uplink resources and HARQ process IDs associated with SPS (block 1202). Method 1200 also includes selecting the HARQ process IDs according to the determined rule(s), where the rules define an offset between the HARQ process IDs associated with the dynamic grants and the HARQ process IDs associated with SPS (block 1204).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method, at a network node, for reducing a probability of collision between Hybrid Automatic Repeat Request, HARQ, process identities, IDs, used for acknowledging transmissions between the network node and a user equipment, UE, the method comprising:
determining HARQ process IDs associated with dynamic grants of uplink resources and HARQ process IDs associated with semi-persistent scheduling, SPS, wherein the HARQ process IDs are determined so as to reduce the probability of collision of the HARQ process IDs; and
indicating at least the HARQ process IDs associated with the dynamic grants to the UE.

2. A method, at a user equipment, UE, for reducing a probability of collision between Hybrid Automatic Repeat Request, HARQ, process identities, IDs, used for acknowledging transmissions between a network node and the UE, the method comprising:
receiving HARQ process IDs associated with dynamic grants of uplink resources; and
communicating HARQ messages using the HARQ process IDs associated with the dynamic grant and HARQ process IDs associated with semi-persistent scheduling, SPS, wherein the HARQ process IDs are determined so as to reduce the probability of collision of the HARQ process IDs.

3. A network node configured for reducing a probability of collision between Hybrid Automatic Repeat Request, HARQ, process identities, IDs, used for acknowledging transmissions between the network node and a user equipment, UE, wherein the network node comprises:
transceiver circuitry configured for communicating with the UE; and processing circuitry operatively associated with the transceiver circuitry and configured to:
determine HARQ process IDs associated with dynamic grants of uplink resources and HARQ process IDs associated with semi-persistent scheduling, SPS, wherein the HARQ process IDs are determined so as to reduce the probability of collision of the HARQ process IDs; and
indicate at least the HARQ process IDs associated with the dynamic grants to the UE.

4. The network node of claim 3, wherein the processing circuitry is configured to determine the HARQ process IDs by selecting the HARQ process IDs associated with dynamic grants from a first pool of HARQ process IDs, wherein the first pool of HARQ process IDs is disjoint from a second pool of HARQ process IDs comprising the HARQ process IDs associated with SPS.

5. The network node of claim 3, wherein N is a sum of the number of the HARQ process IDs associated with dynamic grants and the number of the HARQ process IDs associated with SPS, wherein a HARQ process ID associated with a first dynamic grant is indicated to the UE using fewer bits than a number of bits needed to identify any one of N HARQ process IDs.

6. The network node of claim 5, wherein the processing circuitry is configured to indicate, to the UE, that the HARQ process ID that is indicated pertains to a HARQ process ID associated with the first dynamic grant.

7. The network node of claim 6, wherein the indication that the HARQ process ID pertains to a HARQ process ID associated with the first dynamic grant is located in one or more DCI bits related to a Transport Block Size, TBS.

8. The network node of claim 3, wherein a HARQ process ID associated with a first dynamic grant signaled in a downlink control information, DCI, to the UE is indicated using only three DCI bits.

9. The network node of claim 3, wherein the processing circuitry is configured to select the HARQ process IDs associated with SPS from the second pool of HARQ process IDs, wherein the second pool of HARQ process IDs is disjoint from the first pool of the HARQ process IDs associated with the dynamic grants.

10. The network node of claim 9, wherein the processing circuitry is configured to indicate the selected HARQ process IDs associated with SPS to the UE.

11. The network node of claim 10, wherein N a sum of the number of the HARQ process IDs associated with dynamic grants and the number of the HARQ process IDs associated with SPS, wherein a HARQ process ID associated with a first SPS is indicated to the UE using fewer bits than a number of bits needed to identify any one of N HARQ process IDs.

12. The network node of claim 11, wherein the processing circuitry is configured to indicate, to the UE, that the HARQ process ID that is indicated pertains to a HARQ process ID associated with the first SPS.

13. The network node of claim 12, wherein the indication that the HARQ process ID pertains to a HARQ process ID associated with the first SPS is located in one or more DCI bits related to a Transport Block Size, TBS.

14. The network node of claim 10, wherein a HARQ process ID associated with a first SPS signaled in a downlink control information, DCI, to the UE is indicated using only three DCI bits.

15. A user equipment, UE, configured for reducing a probability of collision between Hybrid Automatic Repeat Request, HARQ, process identities, IDs, used for acknowledging transmissions between a network node and the UE, wherein the UE comprises:
transceiver circuitry configured for communicating with the network node; and
processing circuitry operatively associated with the transceiver circuitry and configured to:
receive HARQ process IDs associated with dynamic grants of uplink resources; and
communicate HARQ messages using the HARQ process IDs associated with the dynamic grants and HARQ process IDs associated with semi-persistent scheduling, SPS, wherein the HARQ process IDs are determined so as to reduce the probability of collision of the HARQ process IDs.

16. The UE of claim 15, wherein the HARQ process IDs associated with the dynamic grants are selected from a first pool of HARQ process IDs and the HARQ process IDs associated with SPS are selected from a second pool of HARQ process IDs, wherein the first pool and second pool of HARQ process IDs are disjoint.

17. The UE of claim 15, wherein N is a sum of the number of the HARQ process IDs associated with the dynamic grants and the number of the HARQ process IDs associated with SPS, wherein a HARQ process ID associated with a first dynamic grant is indicated using fewer bits than a number of bits needed to identify any one of N HARQ process IDs.

18. The UE of claim 17, wherein the processing circuitry is configured to receive an indication that the HARQ process ID that is indicated pertains to a HARQ process ID associated with the first dynamic grant.

19. The UE of claim 18, wherein the indication that the HARQ process ID pertains to a HARQ process ID associated with the first dynamic grant is located in one or more DCI bits related to a Transport Block Size, TBS.

20. The UE of claim 15, wherein a HARQ process ID associated with a first dynamic grant signaled in a downlink control information, DCI, is received using only three DCI bits.

21. The UE of claim 15, wherein the processing circuitry is configured to receive the selected HARQ process IDs associated with SPS from the network node.

22. The UE of claim 21, wherein N is a sum of the number of the HARQ process IDs associated with dynamic grants and the number of the HARQ process IDs associated with SPS, wherein a HARQ process ID associated with a first SPS is indicated using fewer bits than a number of bits needed to identify any one of N HARQ process IDs.

23. The UE of claim 22, wherein the processing circuitry is configured to receive an indication that the HARQ process ID that is indicated pertains to a HARQ process ID associated with the first SPS.

24. The UE of claim 23, wherein the indication that the HARQ process ID pertains to HARQ process ID associated with the first SPS is located in one or more DCI bits related to a Transport Block Size, TBS.

25. The UE of claim 21, wherein a HARQ process ID associated with a first SPS signaled in a downlink control information, DCI, is received in only three DCI bits.

* * * * *

UNITED STATES PATENT AND TRADEMARK OFFICE
CERTIFICATE OF CORRECTION

PATENT NO. : 11,044,055 B2
APPLICATION NO. : 16/613023
DATED : June 22, 2021
INVENTOR(S) : Zhenhua Zou et al.

It is certified that error appears in the above-identified patent and that said Letters Patent is hereby corrected as shown below:

On the Title Page

Under item (73), under "ASSIGNEE", please delete "Telefonaktieboiaget LM Ericsson (publ)" and insert -- Telefonaktiebolaget LM Ericsson (publ) --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*